United States Patent Office 3,737,541
Patented June 5, 1973

3,737,541
METHODS FOR THE TREATMENT OF PARKINSONISM
Hans Rudolf Corrodi, Askim, and Kjell Gunnar Fuxe, Sollentuna, Sweden, assignors to Science Union et Cie, Societe Francaise de Recherche Medicale, Soresues, France
No Drawing. Filed Oct. 20, 1971, Ser. No. 191,125
Claims priority, application Sweden, Apr. 14, 1971, 4,803/71
Int. Cl. A61k 27/00
U.S. Cl. 424—251          5 Claims

ABSTRACT OF THE DISCLOSURE

Pharmaceutical compositions containing 1-(2-pyrimidyl) 4-(3,4-methylenedioxybenzyl) piperazine or a therapeutically acceptable salt thereof and a method for treating of parkinsonism by using the same, are described.

---

The present invention relates to pharmaceutical compositions and a method for the treatment of certain neurological disorders in humans. More particularly, the invention relates to a method of alleviating the symptoms of rigidity, akinesia and tremor in patients suffering from Parkinson's disease, which method comprises administration to a host suffering from such disease a therapeutically effective amount of a compound of the formula

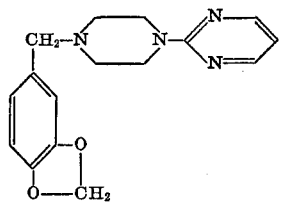

or a therapeutically acceptable salt thereof. The compounds of the Formula I is herebelow denoted ET 495.

Parkinson's disease, or parkinsonism, is considered to be a chronic neurological disorder and is characterized i.a. by tremor, rigidity of the limbs, hypokinesia, or abnormally decreased mobility, and akinesia, or abnormal absence or poverty of movements.

The pathophysiology of parkinsonism in man can, at least partly, be explained with a degeneration in the dopaminergic system in the brain, localized to neucleus caudatus, putamen and substantia nigra. These parts of the brain contain in normal human subjects about 80 percent of the total amount of dopamine in the brain. In patients suffering from parkinsonism a depletion of dopamine,

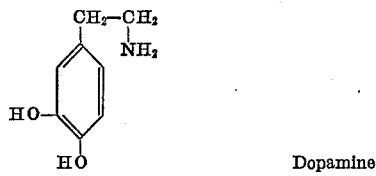
Dopamine in the brain is observed. One rational method for treatment of parkinsonism therefore consists of administering to the patient of L-dopa, the L-form of the compound of the formula

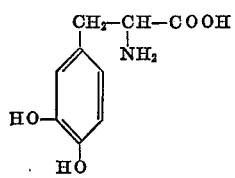
Dopa a precursor of dopamine, which substance does pass the blood-brain barrier and is decarboxylated in the brain under formation of dopamine. Another method for treatment of parkinsonism which has been tested consists of administration of apomorphine,

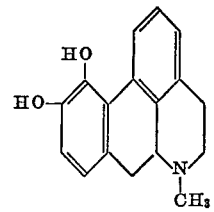
Apomorphine

Apomorphine is a dopaminergic agent which has been tested as an agent for treatment of parkinsonisms, see Cotzias et al. The New England Journal of Medicine 282, 31–33 (1970). Apomorphine has been found to have an alleviating effect on akinesia and rigidity occurring in connection with Parkinson's disease but its severe drawbacks, mainly the short duration of its desired therapeutic effect and its emetic effect, render the therapeutical use of apomorphine for treatment of parkinsonism practically impossible.

One object of the present invention is to provide a therapeutically acceptable method of treating parkinsonism in man using a dopaminergic agent which has a longlasting effect on alleviating rigidity, akinesia and tremor occurring in connection with Parkinson's disease but without exhibiting the serious drawbacks of apomorphine.

Another object of the invention is to provide a method for affecting the bisosynthesis of dopamine in the brain of mammals including man. Still another object of the invention is to provide pharmaceutical compositions useful in the treatment of parkinsonism. These and other objects are achieved by using the compound 1-(2'-pyrimidinyl)-4(3'',4''-methylenedioxybenzyl) - piperazine, with the structural formula

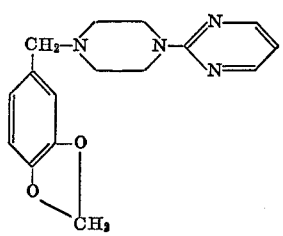

or a therapeutically acceptable salt thereof. The compound of the Formula I is known to have cardiovascular effects, see Laubie et al., European Journal of Pharmacology 6 (1969) 75–82, and it is being used in therapy against various vascular diseases, mainly in the legs. The toxicity of ET 495 is also reported by Laubie et al. loc. cit. The synthesis of the compound is described by Regnier et al., J. Med. Chem. 11, 1151 (1968).

It has now surprisingly been found that the compound of the Formula I is a powerful longlasting dopaminergic agent which can be used to alleviate the symptoms of rigidity, akinesia and tremor in patients suffering from Parkinson's disease. This antiparkinson effect has been observed in different animal experiments.

BIOLOGICAL TESTS

There are two animal models available for the evaluation of central dopaminergic substances in rats, namely (a) measurement of dopamine turnover changes and (b) tests on rotation of rats with unilateral lesions in the brain.

3 (a) Dopamine turnover

Rats are treated with the substance to be tested and 15 min. later with 250 mg./kg. of the tyrosine hydroxylase inhibitor dl-α-methyltyrosine methylester.

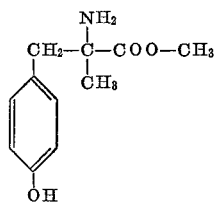

dl-α-methyltryosine methylester    I intraperitoneally. Four hours later the animals are killed and the dopamine in the brains determined spectrofluorimetrically. Since tyrosine hydroxylease is the enzyme which in the multi-step reaction pathway involved in the biosynthesis of dopamine in mammals determines the rate of formation of dopamine, an inhibitor of tyrosine hydroxylation causes a rapid decrease of dopamine in the brain. Dopaminergic agents are known to retard this decrease. So far only one substance is known having such an effect, namely apomorphine, Andén et al., J. Pharm. Pharmacol. 19, 627 (1967). Apomorphine has also been tested in Parkinson patients and was found to have an alleviating effect on akinesia and rigidity, but because of its short duration of action and its well knew emitic property it cannot be used therapeutically.

In Table 1 the compound I and apomorphine are compared regarding their retardation of the dopamine turnover in the rat brain. The amount of dopamine in the brain of the controls was $510 \pm 15$ μg./g.

TABLE 1.—RETARDATION OF DOPAMINE TURNOVER IN RAT BRAIN

| Administered agent | Amount[1] (mg./kg. body weight) | Duration of experiment (hours) | Dopamine in brain in percent of controls at— Mean value of 4 experiments | Standard error of the means ± |
|---|---|---|---|---|
| None (untreated rats) | | | 100.0 | 3.1 |
| Apomorphine | 10 | 2 | 98.3 | 2.7 |
|  | 25 | 2 | 95.0 | 4.2 |
| Tyrosine hydroxylase inhibitor | | 2 | 50.0 | 1.8 |
| Inhibitor plus apomorphine | 10 | 2 | 59.3 | 2.2 |
|  | 25 | 2 | 68.8 | 2.4 |
| ET 495 | 50 | 4 | 105.0 | 3.3 |
|  | 15 | 4 | 99.2 | 7.2 |
|  | 5 | 4 | 99.2 | 6.6 |
|  | 1 | 4 | 93.6 | 4.3 |
| Inhibitor only | | 4 | 30.0 | 1.9 |
| Inhibitor plus ET 495 | 50 | 4 | 53.2 | 3.1 |
|  | 15 | 4 | 47.2 | 3.3 |
|  | 5 | 4 | 44.3 | 2.7 |
|  | 1 | 4 | 36.9 | 4.3 |

[1] Of i.p. administered dopaminergic agent.

Because of the short duration of action of apomorphine, the experiments using apomorphine as dopaminergic substance had to be run two hours only; if the animals receiving apomorphine+inhibitor are kept for 4 hours, a difference to the animals receiving inhibitor only cannot be observed any longer.

The experiment shows a dose dependent retarding action of ET 495 onto the disappearance of dopamine caused by the tyrosine hydroxylase inhibitor. This effect resembles the action of apomorphine in the same animal model, but the compound ET 495 has a longer duration of action.

(b) Rotation of rats with unilateral brain lesions

As described by Ungerstedt (European J. Pharmacology 5, 107 (1968)) interruption of the nigroneostriatal dopamine neurons by injection of 6-hydroxydopamine into the substantia nigra causing a degeneration of the cell bodies of these neurons leads to Parkinson-like symptoms in rats. Injection of dopaminergic substances leads to a dose dependant rotation of the animals towards the un- operated side away from the lesion. This rotation can easily be measured and the duration of the effect determined. In this test again known substances having a clinically verified antiparkinson action are active as summarized in Table 2. Rats with a unilateral lesion in the left nigroneostriatal dopamine path way, produced according to Ungerstedt, loc. cit, were injected intraperitoneally with the test substance and the animal placed in a rotometer where the rotation frequency total number of counts of rotations could be recorded.

TABLE 2.—ROTATION OF RATS WITH UNILATERAL BRAIN LESIONS

| Administered agent | Amount[1] (mg./kg. body-weight) | Total number of count Means value of 5 experiments | Standard error of the means ± |
|---|---|---|---|
| ET 495 | 25 | 1,200 | 200 |
|  | 5 | 100 | 20 |
|  | 1 | 30 | 10 |
| Apomorphine | 5 | 1,300 | 150 |

[1] Of i.p. administered agent.

In contrast to the effect of ET 495, apomorphine had a short duration of action (2–3 hours). At administration of ET 495 the rotations started 3–5 min. after the administration and lasted for 7–10 hours in the highest doses.

In this test also the amino acid L–dopa, another clinically useful antiparkinson agent, is effective. This compound has no direct dopaminoergic effect as apomorphine or ET 495 but it is converted in the brain by the enzyme decarboxylase into the natural transmitter substance dopamine which then induces the rotation of these rats.

In clinical practice the compound ET 495 will normally be administerer orally or parenterally in the form of pharmaceutical preparations comprising the active ingredient in the form of the free base or a pharmaceutically acceptable salt thereof, e.g. the hydrochloride or the methane sulfonate, in association with a pharmaceutically acceptable carrier which may be a solid, semi-solid or liquid diluent or an ingestible capsule, and such preparations comprise a further aspect of the invention. Usually, the active substance will comprise between about 0.1 and about 95% by weight of the preparation, for example, between 0.5 and 20% for preparations intended for injection and between 0.1 and 50% for preparations intended for oral administration.

To produce pharmaceutical preparations in the form of dosage units for oral application containing a compound of the invention in the form of the free base, or a pharmaceutically acceptable salt thereof, the actve ingredient may be mixed with a solid, pulverulent carrier, for example lactose, saccharose, sorbitol, mannitol, a starch such as potato starch, corn starch, amylopectin, laminaria powder or citrus pulp powder, a cellulose derivative or gelatine, and also may include lubricants such as magnesium or calcium stearate of a Carbowax® or other polyethylene glycol wax and compressed to form tablets or centres for dragees. If dragees are required, the centres may be coated for example with concentrated sugar solutions which may contain gum arabic, talc and/or titanium dioxide, or alternatively with a lacquer dissolved in easily volatile organic solvents or mixtures of organic solvents. Dyestuffs can be added to these coatings, for example, to distinguish between different contents of active substances. For the preparation of soft gelatin capsules (pearl-shaped closed capsules) consisting of gelatin and, for example, glycerin, or similar closed capsules, the active substance may be admixed with a Carbowax®. Hard gelatin capsules may contain granulates of the active substance with solid, pulverulent carriers such as lactose, saccharose, sorbitol mannitol, starches (for examples potato starch, corn starch or amylopectin), cellulose derivatives or gelatin, and may also include magnesium stearate or stearic acid. Dosage units for rectal application may be in the form of suppositories comprising the active substance in admixture with a neutral fatty base, or gelatin rectal capsules comprising the active substance in admixture with a Carbowax® or other polyethylene glycol wax.

Liquid preparations for oral application may be in the form of syrups or suspensions, for example solutions containing from about 0.1% to 20% by weight of active substance, sugar and a mixture of ethanol, water, glycerine, propyleneglycol and, optionally, aroma, saccharine and/or carboxymethylcellulose as a dispersing agent.

For parenteral application by injection preparations may comprise an aqueous solution of a water soluble pharmaceutically acceptable salt of the active substance desirably in a concentration of 0.5–10% by weight and optionally also a stabilising agent and/or buffer substance in aqueous solution. Dosage units of the solution may advantageously be enclosed in ampoules.

Dosage units for oral administration preferably contain up to about 100 mg. of the active substance. Maximum daily dose of ET 495 at oral administration is about 300 mg. Dosage units for parenteral administration such as subcutaneous or intramuscular administration, preferably contain up to about 30 mg. of the active substance. Maximum daily dose of ET 495 at parenteral administration is about 100 mg. Such daily dosages may for example be achieved by administering 75 mg. of ET 495 four times a day perorally or 25 mg. of ET 495 four times a day parenterally.

The following examples illustrate how the compound ET 495 can be incorporated in pharmaceutical compositions.

EXAMPLE 1

Preparation of soft gelatin capsules 500 g. of active substance were mixed with 500 g. of corn oil whereafter the mixture was filled in soft gelatin capsules each capsule containing 100 mg. of mixture (i.e. 50 mg. of active substance).

EXAMPLE 2

Preparation of soft gelatin capsules 500 g. of active substance were mixed with 750 g. of peanut oil whereafter the mixture was filled in soft gelatin capsules, each capsule containing 125 mg. of mixture (i.e. 50 mg. of active substance).

EXAMPLE 3

Preparation of tablets 50 kg. of active substance were mixed with 20 kg. of silicon dioxide of the trademark Aerosil, whereafter 45 kg. of potato starch and 50 kg. of lactose were mixed in and the mixture moistened with a starch paste prepared from 5 kg. of potato starch and distilled water, whereafter the mixture was granulated through a sieve. The granulate was dried and sieved whereafter 2 kg. of magnesium stearate were mixed in. Finally, the mixture was pressed into tablets, each weighing 172 mg.

EXAMPLE 4

Preparation of an emulsion 100 g. of active substance were dissolved in 2,500 g. of peanut oil. From the solution thus obtained, 90 g. of gum arabic, aroma and colour (q.s.) and 2,500 g. of water an emulsion was prepared.

EXAMPLE 5

Preparation of a syrup 100 g. of active substance were dissolved in 300 g. of 95% ethanol where 300 g. of glycerol, aroma and colour (q.s.) and water 1,000 ml. were mixed in. A syrup was thus obtained.

EXAMPLE 6

Preparation of a solution 100 g. of active substance were dissolved in 2,000 g. of polyoxyethylene sorbitan monooleate, whereafter aroma and colour (q.s.) and water to 5,000 ml. were mixed in. A drop solution was thus obtained.

EXAMPLE 7

Preparation of effervescent tablets 100 g. of active substance, 140 g. of finely divided citric acid, 110 g. of finely divided sodium hydrogen carbonate, 3.5 g. of magnesium stearate and aroma (q.s.) were mixed and the mixture was pressed into tablets, each containing 100 mg. of active substance.

EXAMPLE 8

Preparation of a sustained release tablet 200 g. of active substance were melted together with 50 g. of stearic acid and 50 g. of carnauba wax. The mixture thus obtained was cooled and ground to a particle size of at most 1 mm. (diameter). The mass thus obtained was mixed with 5 g. of magnesium stearate and pressed into tablets each weighing 305 mg. Each tablet thus contains 200 mg. of active substance.

What we claim is:

1. A method for treating parkinsonism, which comprises administering to a host suffering from such disease an effective amount of 1-(2-pyrimidinyl)-4-(3,4-methylenedioxybenzyl) piperazine or a therapeutically acceptable salt thereof.

2. A method for alleviating symptoms of rigidity, akinesia, hypokinesia and tremor, which comprises administering to a host suffering from such symptoms an effective amount of 1-(2-pyrimidinyl)-4-(3,4-methylenedioxy benzyl) piperazine or a therapeutically acceptable salt thereof.

3. A method for affecting the biosynthesis of dopamine in the brain of mammals, which comprises administering to a host in need of such treatment an effective amount of 1-(2-pyrimidinyl) - 4 - (3,4 - methylenedioxy benzyl) piperazine or a therapeutically acceptable salt thereof.

4. A method according to claim 3 where the effective amount is administered orally and is up to about 300 mg./dy.

5. A method according to claim 3 where the effective amount is administered parenterally and is up to about 100 mg./dy.

References Cited

UNITED STATES PATENTS 3,299,067   1/1967   Regnier et al. _____ 424—251

OTHER REFERENCES

Laubie et al.: European Journal of Pharmacology, 6 (1969), pp. 75–82.

STANLEY J. FRIEDMAN, Primary Examiner